US012751580B2

(12) United States Patent
Lerner

(10) Patent No.: US 12,751,580 B2
(45) Date of Patent: Oct. 6, 2026

(54) ROBOTIC SYSTEM FOR THE CYCLIC PREPARATION OF A FOOD PRODUCT

(71) Applicant: Igor Sergeevich Lerner, Yaroslavl (RU)

(72) Inventor: Igor Sergeevich Lerner, Yaroslavl (RU)

( * ) Notice: Subject to any disclaimer, the term of this patent is extended or adjusted under 35 U.S.C. 154(b) by 563 days.

(21) Appl. No.: 18/277,827

(22) PCT Filed: Dec. 3, 2021

(86) PCT No.: PCT/RU2021/000542
§ 371 (c)(1),
(2) Date: Aug. 18, 2023

(87) PCT Pub. No.: WO2022/182267
PCT Pub. Date: Sep. 1, 2022

(65) Prior Publication Data

US 2024/0130570 A1 Apr. 25, 2024
US 2024/0225367 A9 Jul. 11, 2024

(30) Foreign Application Priority Data

Feb. 25, 2021 (RU) ................................ 2021104651

(51) Int. Cl.
*A47J 44/00* (2006.01)
*A23P 20/20* (2016.01)
*G07F 17/00* (2006.01)

(52) U.S. Cl.
CPC ............... *A47J 44/00* (2013.01); *A23P 20/20* (2016.08); *G07F 17/0064* (2013.01)

(58) Field of Classification Search
None
See application file for complete search history.

(56) References Cited

U.S. PATENT DOCUMENTS 6,024,013 A * 2/2000 Goharrizi ............ G07F 17/0078 219/400
2011/0059209 A1* 3/2011 Khatchadourian .. A21C 11/006 426/232
(Continued)

FOREIGN PATENT DOCUMENTS

DE 29810946 U1 * 12/1999 ................ A47J 9/00
FR 2841025 A1 * 12/2003 ......... G07F 17/0078
(Continued)

*Primary Examiner* — John J Norton
(74) *Attorney, Agent, or Firm* — Nadya Reingand

(57) ABSTRACT

A robotic system for preparing layered foodstuffs comprises a conveyor subsystem having an intelligent working member that travels through an equipped loading and unloading area, within the operating region of which are equipment for storing and supplying bases and, adjacent thereto, a food primary processing subsystem. The storage and supply equipment is configured in the form of an automated refrigeration unit having a rotating manipulator mechanism for the bases, which is combined with an integrated device for picking up and supplying the bases to an active surface of the working member for the subsequent culinary processing of said bases. The combined working of the different systems is controlled by an intelligent device connected to a central server, providing the high-speed, faultless and precise application of ingredients.

14 Claims, 6 Drawing Sheets

(56) References Cited

U.S. PATENT DOCUMENTS

| | | | | |
|---|---|---|---|---|
| 2012/0185086 | A1* | 7/2012 | Khatchadourian | G07F 11/70 99/345 |
| 2018/0310773 | A1* | 11/2018 | Sekar | A47J 44/00 |
| 2018/0338504 | A1* | 11/2018 | Lavri | A21C 3/02 |
| 2019/0272699 | A1* | 9/2019 | Mohammed | G07F 13/10 |
| 2021/0282409 | A1* | 9/2021 | Kesler | A21B 1/48 |
| 2023/0148094 | A1* | 5/2023 | Shafran | A21B 3/07 700/28 |

FOREIGN PATENT DOCUMENTS

| | | | | |
|---|---|---|---|---|
| KR | 20060098153 | A * | 9/2006 | G07F 11/04 |
| KR | 101982597 | B1 * | 5/2019 | G07F 9/10 |
| WO | WO-2005015509 | A1 * | 2/2005 | G07F 17/0078 |

* cited by examiner

ROBOTIC SYSTEM FOR THE CYCLIC PREPARATION OF A FOOD PRODUCT

FIELD OF THE INVENTION

The present invention relates to the field of high-tech competitive equipment provided with a unified network of culinary-purpose industrial robots controlled by intelligent advanced devices that are programmatically configured to control slave systems, the cumulative task of which is to obtain ready-to-eat food products having a predominantly layered structure, such as sandwiches, hamburgers, buttered breads, pies, spring rolls, pizza, salads, etc.

BACKGROUND OF THE INVENTION

WO18165105 (IPC A23L 5/10, published on Sep. 13, 2018; hereinafter—[1]) discloses an automatic kitchen system which is implemented in the form of a manipulative assistant robot.

The culinary assistant robot known from [1] is oriented to operation in industrial conditions and is capable of being an auxiliary unit in performing a wide range of culinary tasks and, as a rule, is used under the direct supervision of a professional chef.

The main task of this culinary robot is its technical adaptation for the possibility of partial or complete automation of prepared food dishes.

Of the technical aspects common with the present invention, it should be noted the purpose which consists in the complete or partial automation of the processes of preparing culinary dishes, as well as the presence of an automatic manipulator mechanism adapted to perform certain culinary operations controlled by a computer processor and associated, in particular, with the movement of culinary components, their processing and subsequent transfer of finished products to a direct consumer.

The automatic manipulator mechanism of the assistant robot known from [1] consists of a manipulator imitating a human hand and capable of performing gripping and other tactile actions that become possible due to the presence of a sensor unit, a plurality of video surveillance cameras that monitor a culinary action, and a controller that directly ensures the movement of the manipulator. At the same time, the processor used to control the operation of the assistant robot has intelligent characteristics that allow programming and, accordingly, adjusting the operation based on the characteristics of an order, the characteristics of the recipe itself and information about the available kitchen equipment, as well as data transmitted from the video surveillance cameras.

It should be taken into account that the system known from [1] has an auxiliary purpose and is not actually intended for autonomous independent operation, since it needs constant monitoring by attendants who are obliged to monitor the progress of culinary operations, to make manual adjustments and changes in operation, if required, as well as to timely replenish consumable food materials. All of this in turn does not allow one to fully identify this system with some kind of automatic system that can operate for a long time without outside help.

Furthermore, the system known from [1] has a narrow operating range of effective action, since the existing equipment is designed exclusively to operate according to a uniform specific algorithm which, however, may be subject to production changes and adjustments, but still has a narrow action profile oriented mainly to grip objects, hold them with possible overturns and transfer them to a neighboring site for further processing.

US2020268210 (IPC A47J 44/00, published on Aug. 7, 2020; hereinafter—[2]) discloses an automatic kitchen system.

The kitchen system known from [2] implies the possibility of automatic control of available food ingredients, including the ability to their storage, transfer and distribution in order to obtain high-quality ready-to-eat food dishes of various contents.

It should be noted that the process of transferring and distributing food components from temporary storage places to kitchen utensils for their further processing is also automated, and there is a specialized control algorithm for doing this. In addition, the internal movement of the food components is performed by vehicles, while assembly and dispensing processes are also completely automated.

The implementation of the existing arsenal of interconnected functionality is carried out in view of the fact that the system known from [2] has equipment that, using specialized software and hardware, launches interconnected production cycles which involve a number of automated culinary production procedures associated with the collection of necessary culinary blanks, including their subsequent processing with their replenishment with certain components, with the production movement of partially finished products by means of vehicles, as well as with the automatic supply of the finished products to an end user.

The significant features of the culinary system known from [2], which form the basis of the inventive concept, should be considered an intelligent system for moving the food products, which comprises a set of rail tracks along which vehicles structurally adapted to transport food containers move, as well as stopping points, charging elements and means for switching the rail tracks.

Furthermore, the system known from [2] provides for the presence of devices for temporary storage of food components with compartments for storing a plurality of containers, devices for activating the containers, as well as devices for transferring the food components.

The automated kitchen system known from [2] significantly reduces labor costs and, at the same time, produces food of consistently high quality.

It should be noted that the system known from [2] is externally made in the form of a separate room having a passage for personnel, which is a volumetric closed-type housing block that allows one to place and combine equipment and provide free access for the personnel for the purpose of periodic inspection and maintenance. Therefore, this object can be characterized as a kind of autonomous production system that can be successful. However, the range of its application in the service market seems to be limited, since culinary systems that are not available for general viewing are ineffective when they are installed in restaurant catering outlets because they do not inspire consumer confidence in quality of the resulting products. Therefore, limited-access back-office facilities can be a reasonable option for its arrangement, and actual options for the sale of the resulting products can cover both local food outlets and external ones that require delivery of products by courier services.

It should also be noted that the system known from [2] is mainly oriented for use on an industrial scale. By its structure, it is a complex multi-level robotic structure comprising a large number of unique mechanisms interacting with each other, while many of them have experimental unverified structures and connections that will be negatively affect the operation of the system and require technical intervention in order to make adjustments to the operation of the equipment or change the design of individual units. This technical intervention is thus directly related to stopping the production cycle and losing competitive advantages as a result.

CN 112273986 (IPC A47J 44/00, published on Jan. 29, 2021; hereinafter—[3]) discloses an automatic cooking system.

The automatic system known from [3] is made in the likeness of vending machines that can be placed both outdoors and indoors and are adapted for the sale of drinks, snacks, chocolate bars and other similar products. However, in this case, the trading concept does not provide for the sale of factory products, but the direct production and subsequent sale of food made of many ingredients pre-loaded and stored in separate cells.

In fact, the system known from [3] is a relatively compact multifunctional system having a housing design, with the help of which it is possible to order a certain food product mainly from the segment of instant food products and the ordered food product will be produced in the presence of a customer and handed out subject to payment for this service.

Such a production machine operates in an automatic mode, the operation of which is supported by a computer device with appropriate software. More specifically, the computer device provides the software control of interconnected means for transferring food ingredients, means for moving prepared products, processing equipment, actuators, as well as means for transferring and preparation for issuance of finished products to a specific consumer who has passed a verification procedure.

A remarkable feature of this production machine is its relatively compact size and high productivity, as well as the presence of a subsystem designed to remove smoke generated during thermal actions taken when preparing the food products. In addition, a cooking smoke purification system is provided, which will allow the safe operation of this culinary machine both inside buildings and outdoors.

The undeniable advantage of the analyzed system known from [3] is the creation of a relatively promising retail trade concept that allows one to cook hot food in a vending machine which can be located on the street, in a building, in the subway, at a transport crossing, and also in other places, which saves time by avoiding queues which are an integral feature of fast food chains and possibly saves money because this production machine operates autonomously, does not take up much space, does not need the constant presence of service personnel, thereby minimizing the cost of its maintenance, which in a market economy can affect towards lower prices.

Another important and already mentioned feature should be considered relatively compact sizes and at the same time high performance, which is ensured by the equipment placed both inside and outside, which, in turn, is optimally dispersed relative to the machine body with maximum use of usable space.

However, this concept is not without drawbacks, and they are manifested in the following.

It should be noted that such vending machines are more likely to be damaged for the purpose of theft of products or for hooligan motives, since in many cases the equipment is on the streets and, accordingly, is not guarded.

These vending machines can cause great user interest, which can provoke an increased demand for this kind of service and, accordingly, entail intensive operation of the vending machine. As a result, this will lead to increased consumption of food raw materials, which may end at an inopportune moment and stop a production process until the arrival of service personnel.

The maximum use of free space in this culinary machine can contribute to unintentional mixing of food components, and therefore cooking recipes will be violated. The commodity neighborhood may also be violated and, as a result, odors will be mixed, which will also lead to a violation of the technological process and an actual decrease in product quality. In addition, the technological equipment located on the outer side of the machine body, including containers for storing food components, may be exposed to external atmospheric influences and, therefore, may be damaged before its deadline.

SUMMARY OF THE INVENTION

The technical problem of the present invention is the creation of a commercially promising automatic culinary system that has a high production potential and improved technical and operational performance, a robotic component, and is structurally adapted for preparing mainly layered ready-to-eat food products in industrial volumes and under cooled conditions.

The technical result of the present invention, which solves the above-indicated technical problem, is the implementation of the above-indicated purpose for designing a technically promising competitive culinary production system having a significant margin of functionality and operating in an automatic cyclic mode which allows one to obtain high-demand ready-to-eat food products with high quality, high speed, error-free and accurate application of food components.

The existing technical problem and the above-indicated technical result are achieved by a robotic culinary system for preparing layered food products under cooled conditions, which comprises a conveyor subsystem having an intelligent working member that travels through an equipped loading and unloading section, within the operating region of which a storage and primary supply equipment for food or non-food bases and a food preparation subsystem adjacent to the storage and primary supply equipment are arranged. The storage and primary supply equipment is configured as an automated refrigeration unit having a rotating manipulator mechanism for the food or non-food bases, which is combined with an integrated device for picking up and primary supply of the food or non-food bases to an active surface of the working member for subsequent culinary processing of the bases. The food preparation subsystem provides a calculated layer-by-layer delivery of used food components to the corresponding food or non-food base and, accordingly, is configured as a group of dosing and distribution units, one part of which has an individual device for processing and releasing the food components, while the other part of which is combined into a single separate object that delimits the units relative to each other, providing a dosed delimited extraction of the food components using the common processing and releasing device activated in case of positioning with the required unit. The complex operation of the involved subsystems is controlled by an intelligent device connected to a central server. At the end of the cooking cycle of each food or non-food base, the intelligent device sends a control signal to a means for transferring a practically prepared food product which is arranged in the end area of the loading and unloading section and transfers the practically prepared food product to an integrated subsystem for temporarily storing and issuing a possibly packaged ready-to-eat food product, which is interconnected with a packaging device. The possibly packaged ready-to-eat food product subsequently, mainly in a heated state, enters an intake area which is activated for a consumer if a verification procedure is successfully completed.

According to one of the most promising embodiments of the present invention, a two-coordinate carrier table is used as the intelligent working member of the conveyor system and configured to move along equipped beams laid on a support means.

It is most preferable if the two-coordinate carrier table comprises a support having a working platform installed thereon, the working platform being configured to move in longitudinal and transverse directions.

One embodiment of the invention is possible, in which the conveyor subsystem comprises an equipped conveyor device having an endless belt serving as the intellectual working member.

According to the most rational embodiment of the invention, the single separate object has a rounded cross-section.

The two-coordinate carrier table used according to the perspective embodiment of the invention can be equipped with a digital product quality monitoring tool.

According to a particular embodiment of the invention, the digital product quality monitoring tool is implemented, as a rule, as a photo and/or video camera.

The intelligent device used in the present invention is configured to analyze incoming images from the product quality monitoring tool and, in case of incomplete reference compliance of the products, generate programmed command signals activating the necessary operational modes of the equipment aimed at eliminating deficiencies of the products.

In addition, the intelligent device is configured to analyze the received images by comparing them with loaded reference images, and in case of an unsatisfactory result, generate and send a command signal for the withdrawal of low-quality products, which is implemented by an actuating element arranged within the loading and unloading section of the conveyor subsystem.

According to one of the most probable embodiments of the system, the cooled conditions are provided by a box that creates the possibility of cooling an enclosed space, inside which the main and auxiliary equipment is arranged together. At the same time, the box, as a rule, is made transparent and is adapted for a visual overview of the processes of product preparation taking place inside.

There may also be such a constructive embodiment of the system, in which the cooled conditions are provided due to the presence of autonomous individually configured cooling systems for the main production equipment.

Within the loading and unloading section, it is allowed to install a dosing device for pouring dough used for the preparation of flour and bakery bases (pancakes, waffles, pita bread, burger buns, etc.). The dosing device is a tank of a given volume for storing the dough (made of glass, stainless steel, other material), equipped with a dough supply valve and a device for distributing the dough on a non-food base (dispenser), which has a circular rotation function and is controlled by an electric motor.

Within the loading and unloading section, it is also allowed to install an oven used for baking the products.

A particular embodiment of the system implies that an exhaust device for removing odors emanating from the prepared products is arranged in the operating region of the loading and unloading section.

The automated refrigeration unit is usually cylindrical in shape.

According to the developed inventive concept, attention is drawn to the robotic system for the cyclical production of ready-to-use products of relatively quick preparation. This system is distinguished by significant essential features, which include the operating conditions of the system in a cooled environment, the structural dispersal of the interconnected equipment in the system, as well as the independence and autonomy of the system operation, which is accompanied by full automation of production cycles performed using a group of programmable industrial robotic tools structurally and programmatically configured to perform culinary actions and manipulations in order to ultimately obtain high-quality ready-to-eat products characterized by layer-by-layer application of food components.

The basic design features of the robotic system for the step-by-step production of layered culinary products, which make a significant contribution to the prior art and essentially define the subject matter to be patented, are as follows: the well-established operation of the automatic and functionally interconnected equipment that is relatively compactly dispersed in one cooled production area protected from external influences. This equipment includes the subsystems for limited storage and primary supply of products, the conveyor system that moves the food or non-food bases for the purpose of their culinary processing for the possibility of subsequent transfer to packaging equipment and ultimately to dispensing equipment that is configured to heat the products and temporarily store them, after which the products are transferred directly to a consumer who has successfully passed the verification procedure.

From the standpoint of the inventive concept and the achievement of the necessary positive result, attention should be drawn to the presence of the intelligent device connected to the central control server, from which it receives information about the need to prepare a specific order. Due to the subordinate functionally interconnected programmed robotic equipment that is structurally adapted to the cooking process, a food product is prepared according to the characteristics of the order and is subjected to individual culinary processing and then goes to the consumer of the food product.

In technical terms, it is important to emphasize that the presence of groups of interconnected and interacting production equipment pieces dispersed in one production cooled area—a significant part of which are robotic tools controlled by the intelligent device and functionally adapted and programmatically configured to perform the necessary culinary procedures related, in particular, with the supply of products by capturing and moving them, replenishing with ingredients and their final distribution to a consumer—creates a kind of organic, promising and technically perfect structure comprising innovative manipulator devices that can greatly simplify work and increase the speed of processing product orders, thereby ensuring error-free and machine-like accuracy of movements on all involved production stages. This, in turn, allows the system to operate autonomously for a long time without the control of service personnel, and as a result, there is a significant competitive advantage and further prerequisites for the commercially successful introduction of this technology to the market for high-quality production of culinary products.

It should be noted that the equipment used for the storage and primary supply of product components, which is configured as the automated cylindrical refrigeration unit, in combination with the existing rotary manipulator mechanism combined with the automatic device for picking up and primary supply of the products to a culinary processing line, creates an ergonomically adjusted technical section of the system, which is capable of using the available rotational process and the cylindrical configuration in order to optimize the spatial position of products that effectively occupy the available usable volume. This certainly has a positive effect and increases production potential, while maintaining a balance of high product quality and high production volumes.

In addition, it should be noted that since the group of individually designed dosing and distribution units comprises the separate part of units which are combined into the single separate object delimiting the units included in its composition relative to each other in order to provide a dosed delimited extraction of food components using the processing and releasing device common to the object and activated in case of its positioning with the required unit, favorable conditions for the optimal and rational use of the available food raw materials can be created, while increasing the content and variety of food components and maintaining the previous conditionally established production dimensions of the culinary system.

Thus, the above-proposed constructive implementation of the robotic production system for the step-by-step production of layered culinary products, taking into account its characteristics and technical features, forms a set of features sufficient to: (i) achieve the above-indicated technical result which consists in designing a technically promising competitive culinary production system having a significant margin of functionality and operating in an automatic cyclic mode which allows one to obtain high-demand ready-to-eat food products with high quality, high speed, error-free and accurate application of food components; and (ii) solve the existing technical problem of creating a promising automatic culinary system that has a high production potential and improved technical and operational performance, a robotic component, and is structurally adapted for preparing mainly layered ready-to-eat food products in industrial volumes and under cooled conditions.

BRIEF DESCRIPTION OF THE DRAWINGS

FIG. 5*a* shows a side view of the conveyor system, and FIG. 5B shows a top view of the conveyor system;

DETAILED DESCRIPTION OF THE INVENTION

Figure 1:
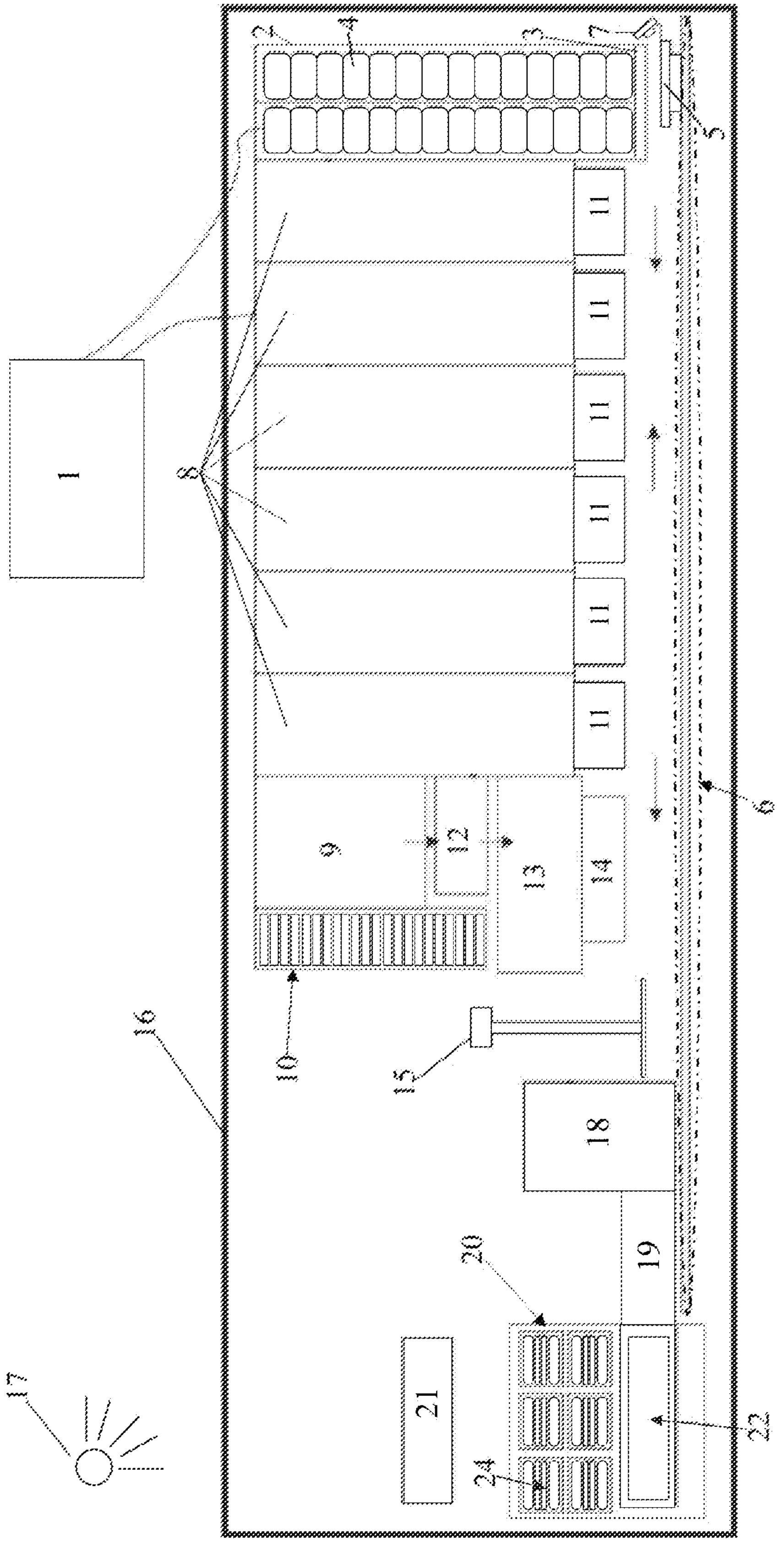
FIG. 1 shows a block diagram of a production system.
Figure 2:
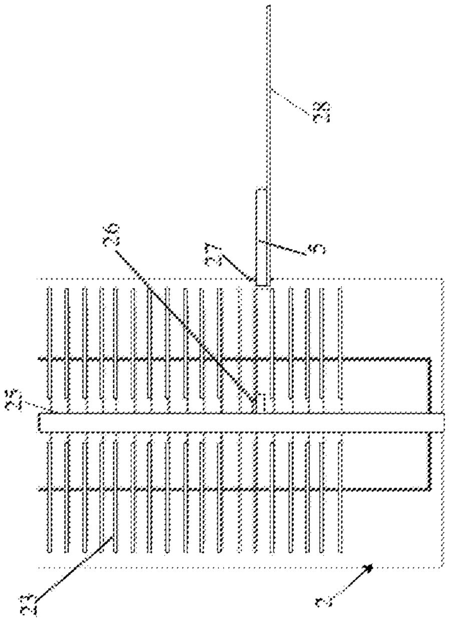
FIG. 2 shows storage and primary supply equipment at the time of transfer of a food or non-food base for its culinary processing.
Figure 3:
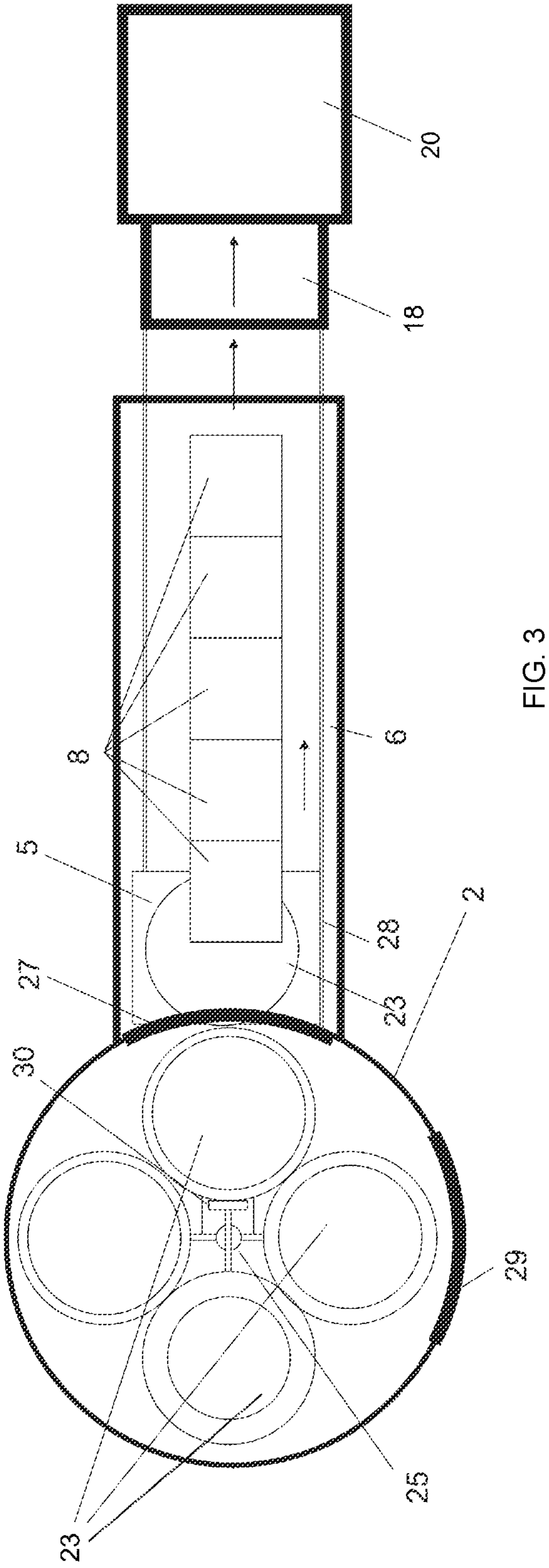
FIG. 3 shows a top view of the production system.
Figure 4:
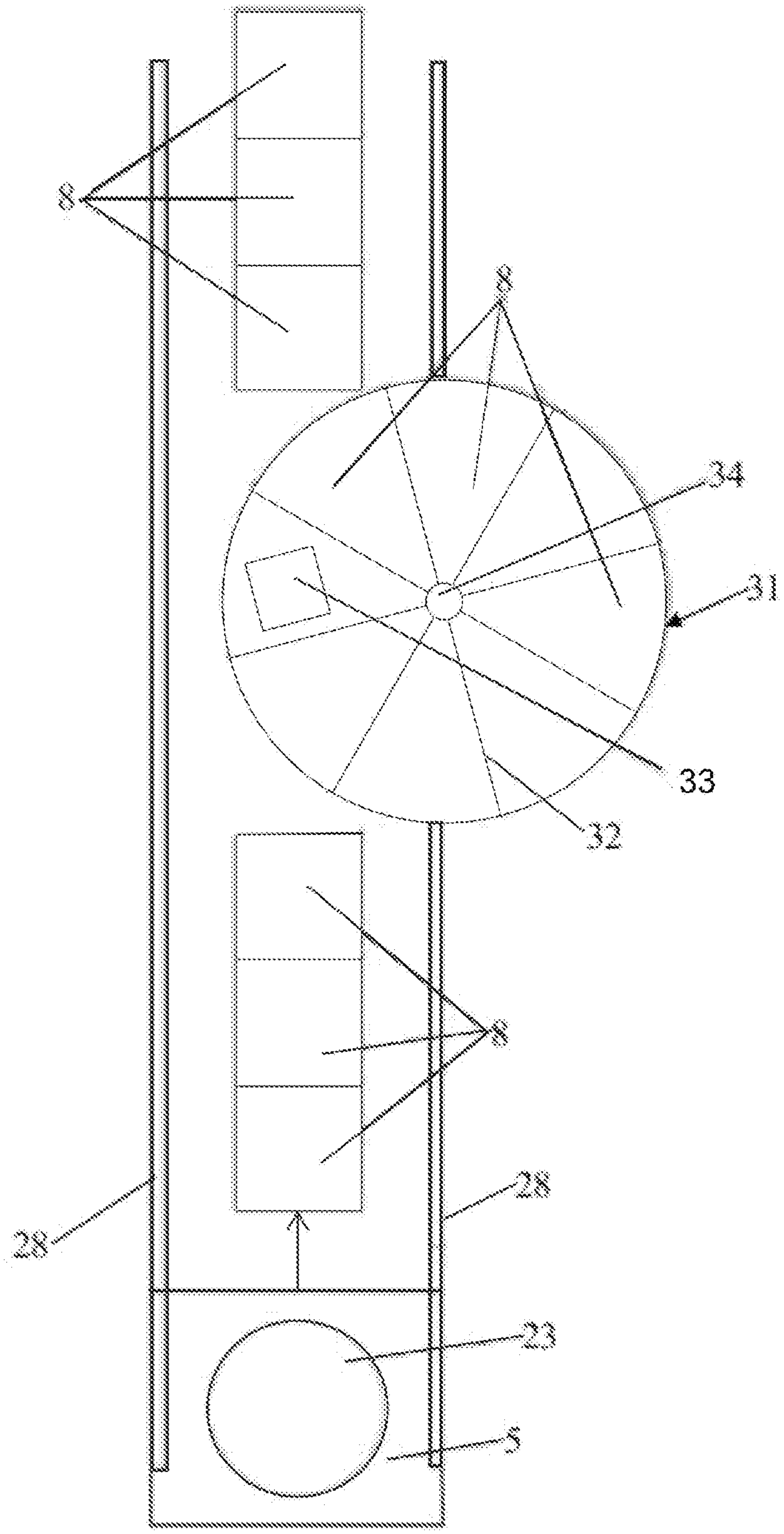
FIG. 4 shows an embodiment of a food preparation system that replenishes food bases with ingredients.
Figure 5A:
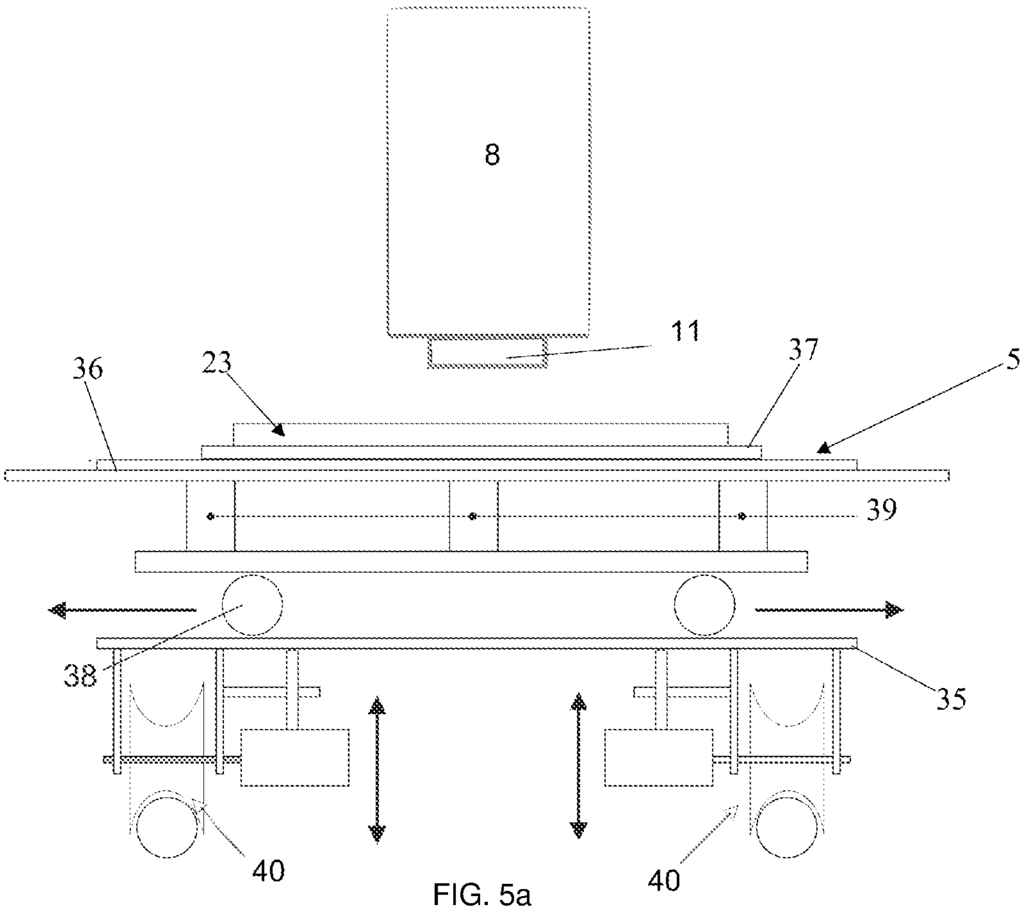
FIGS. 5A and 5B show a conveyor system having an intelligent working member, namely.
Figure 5B:
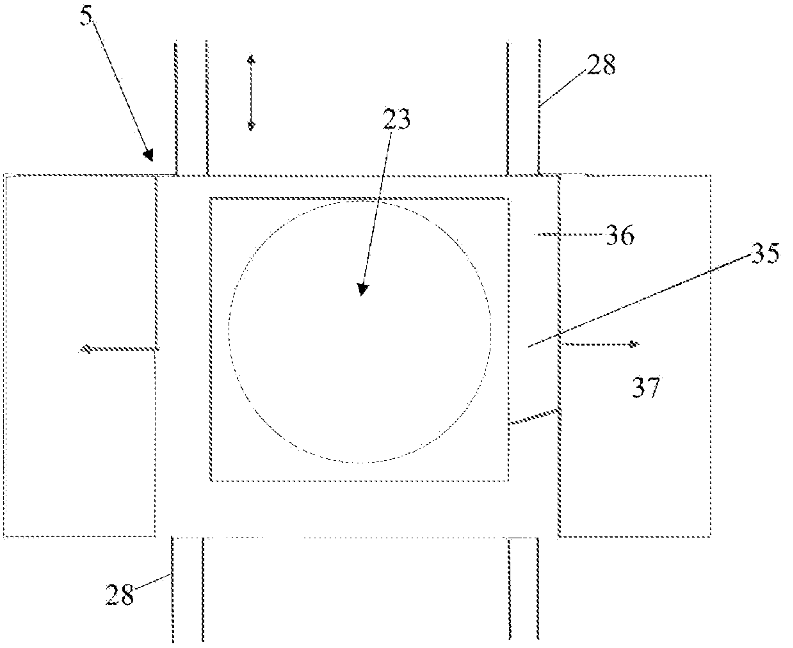

The invention is explained by a specific exemplary embodiment which, however, is not the only possible, but clearly demonstrates that the specified set of essential features allows one to achieve the above-indicated technical result, as well as to solve the existing technical problem.

The figures show the following parts and elements of the proposed robotic production system:

1—intelligent device;
2—automated refrigeration unit;
3—device for picking up and primary supply of food or non-food bases;
4—rows of stored food or non-food bases;
5—two-coordinate carrier table;
6—loading and unloading section;
7—digital video camera;
8—dosing and distribution units;
9—special dosing and distribution unit for minced meat products;
10—special dosing and distribution unit for frozen semi-finished products;
11—individual devices for processing and releasing food components;
12—mechanism for forming cutlets;
13—device for thermally treating cutlets;
14—mechanism for feeding cutlets to a food base;
15—actuating element for removing low-quality products;
16—box;
17—antibacterial ultraviolet radiation means;
18—packaging device;
19—means for transferring formed products;
20—subsystem for storing and issuing finished products;
21—interactive screen for interaction with a consumer;
22—finished product intake area;
23—food or non-food bases;
24— ready-to-eat products;
25—rotational manipulator mechanism;
26—mechanism for pushing food or non-food bases;
27—opening for the primary supply of food or non-food bases;
28—beams;
29—door for the primary loading of food or non-food bases;
30—piston-pusher;
31—single separate object;
32—dividing partitions;
33—common processing and releasing device;
34—electric motor with a drive for rotation;
35—support;
36—working platform;
37—metal support;
38—servos;
39—weight sensors;
40—bearing devices with screw pairs and revolution counters;
41—moving elements;
42—packaging sheet;
43—pistons;
44—press pushers.

The proposed robotic production system for the step-by-step production of layered culinary products comprises a conveyor subsystem having an intelligent working member travelling through an equipped loading and unloading section 6. A two-coordinate carrier table 5 is used as the intelligent working member of the conveyor system, and it is configured to move along equipped beams 28 arranged on the loading and unloading section 6.

Within the operating region of the loading and unloading section 6, there is equipment for storage and primary supply of food or non-food bases 23, as well as a food preparation subsystem adjacent to said equipment. At the same time, the equipment for storage and primary supply of the food or non-food bases 23 is configured as an automated refrigeration unit 2 having a cylindrical shape and a rotational manipulator mechanism 25 necessary for moving the food or non-food bases 23. This rotational manipulator mechanism 25 is combined with an integrated device 3 for picking up and primary supply of the food or non-food bases 23 which, as a result, come to the active surface of the two-coordinate carrier table 5 for the purpose of their subsequent culinary processing. It should be noted that the pickup and initial supply device 3, as already indicated, is integrated with the refrigeration unit 2 and comprises a pushing mechanism 26 with a piston-pusher 30, which extracts the food or non-food base 23 out through an opening 27 serving for the primary supply of the food or non-food bases 23 on the active surface of the two-coordinate carrier table 5 which is the outer surface of a working platform 36. The working platform 36 is configured to move in the longitudinal and transverse directions.

The food preparation subsystem is made with the possibility of calculated layer-by-layer issuance of food components on the corresponding food or non-food base 23 and is configured as a group of dosing and distribution units 8, one part of which has an individual device for processing and releasing food components 11, and the other part of which is combined into a single separate object 31. The single separate object 31 delimits the units 8 relative to each other, providing the dosed delimited extraction of the food components using a common processing and releasing device 33 which is activated in case of its positioning with the required unit 8.

This food preparation subsystem may also comprise dosing and distribution units 9 and 10 of a special design and purpose, so that the special unit 9 is designed for distribution and grinding of meat products, and the special unit 10 is intended primarily for the distribution of frozen semi-finished products.

The complex operation of all available systems and subsystems is controlled by an intelligent device 1 connected to a central server, which, upon completion of the cooking cycle of each food or non-food base 23, sends a control signal to a means 19 for transferring practically formed products which is arranged within the end area of the loading and unloading section 6 and transfers the practically formed products to an integrated subsystem 20 for temporarily storing and issuing possibly packaged and ready-to-eat products 24 which is interconnected with a packaging device 18. Subsequently, the possibly packaged and ready-to-eat products 24, as a rule, in a heated state, enter the intake area 22 which is activated for a consumer if the verification procedure is successfully completed.

The two-coordinate carrier table 5 is usually equipped with a digital video camera 7, as a result of which the intelligent device 1 is able to analyze images coming from it. This makes it possible to generate, for example, in the case of incomplete reference compliance of the products, certain command signals that activate the equipment operation modes aimed at eliminating the product deficiencies. Furthermore, by analyzing the images and comparing them with the reference ones, the intelligent device 1 can, in case of an unsatisfactory result, generate command signals for the removal of low-quality products, which is implemented by an actuating element 15 arranged within the loading and unloading section 6.

The proposed robotic production system for the step-by-step production of layered culinary products can be implemented as follows.

It should be noted that the purpose of the following description of the present invention is not to limit it to a specific implementation and embodiment, but rather to cover all possible additions that do not go beyond the scope of the appended claims.

The production processes of the proposed production system are controlled by the intelligent device 1 which is a modern computer processor, wherein the device is connected to the central server and connected to the Internet or a similar data network.

The intelligent device 1 has software that provides the transfer of information about incoming orders and the operation of all equipment of the production system.

It is possible to order a specific layered culinary product (sandwiches, buttered breads, pies, spring rolls, pizza, salad, etc.), as well as choose, if desired, its filling and cooking features using any electronic device (smartphone, tablet, electronic bracelet, computer, laptop, etc.) connected to the Internet, or it can be done directly on site using an interactive screen 21 designed to interact with a consumer. The order is in the form of electronic information about the type of products, and it may also contain information about the type of products, filling, composition, baking time, etc.

Having received an information signal, the intelligent device 1 processes it by means of a software algorithm and forms, and subsequently controls a certain operation mode of the equipment of the system to prepare a particular culinary product (sandwich, sandwich, pie, spring roll, pizza, salad, etc.). At the same time, the database of the central server contains many programs for preparing various layered culinary products, as well as algorithms for the correct choice of the food or non-food bases 23, the supply of necessary food components, cooking modes and features, options for packaging food products and issuing them directly to the consumer.

In the proposed production system, various food components can be used, which are stored in the dosing and distribution units 8. The special units 9 and 10 can also be used, which contain minced meat components and frozen meat semi-finished products, respectively.

As the food bases, as a rule, bread rolls, pieces of sliced bread, pita bread, as well as other flour-based products, which can be a fundamental element of a culinary product, are used.

As the non-food bases, as a rule, substrates for pizza, pies, containers for bread rolls and bread for hamburgers and sandwiches, plates for salads, soups, main dishes are used, which are made of a material allowed for contact with food products and can be subjected to heat treatment (polymer, plastic, stainless steel, etc.).

The food or non-food bases 23 are placed at regular intervals through an outward-opening door 29 into the automated refrigeration unit 2 of a cylindrical shape and are placed in it on sequentially stacked shelves of the rotational manipulator mechanism 25 arranged to rotate around the central vertical axis, thereby forming several vertical rows 4 with the food or non-food bases 23.

After the central server receives information about the order of a certain product, it transmits the information about the order to the intelligent device 1 which, using the software algorithm, generates a command to start the operation of the production system. As a result, the food or non-food bases 23 are fed for further processing to the two-coordinate carrier table 5 with the help of the integrated pick-up and primary supply device 3, the pushing mechanism 26 of which, by means of its piston-pusher 30, moves the currently required food or non-food base 23 into the opening 27 through which the working platform 36 partially passes from the outside. The food or non-food base 23 is placed on the active surface of the working platform 36. It should be noted that the pushing mechanism 26 is configured as a static support element mounted on the central post of the mechanism 25 opposite the opening 27.

All food or non-food bases 23 forming the rows 4 in the refrigeration unit 2 are associated with a certain shelf of the rotary manipulator mechanism 25 and information about this is stored into the database of the central server.

Thus, the pick-up and primary supply device 3 of the refrigeration unit 2 delivers the food or non-food base 23 to the production site necessary for further processing, while the software compares the food or non-food bases 23 with the received orders and selects one of them as necessary for the preparation of layered confectionery products (sandwich, sandwich, pie, spring roll, pizza, salad, etc.), which, being on the working platform 36 of the two-coordinate carrier table 5, gradually moves to the main production culinary stage.

After the pick-up and primary supply device 3 has transferred the food or non-food base 23 to the two-coordinate carrier table 5, the intelligent device 1 instructs, using the software algorithm, the two-coordinate carrier table 5 to move a certain distance along the beams 28 within the loading and unloading section 6 to pass through it for the purpose of layer-by-layer replenishment with the food ingredients stored in the dosing and distribution units 8, as well as in the special dosing and distribution units 9 and 10, respectively. This operation is possible, since the two-coordinate carrier table 5 is mounted on the beams 28 and includes servos 38 and a bearing device 40 with screw pairs and revolution counters.

Data is stored into the intelligent device 1 in advance, which includes the coordinates of the beginning of the action zone of each dosing and distribution unit 8 with the individual device 11 for processing and releasing the food components, including all special dosing and distribution units 9 and 10 with their mechanism 14 for feeding the ingredient to the food or non-food base 23. In view of this, by transmitting a command to the servos 38 to move the two-coordinate carrier table 5 forward or backward along the beams 28, the intelligent device 1 delivers the food or non-food base 23 to that place in which this or another food ingredient is to be applied on the base.

The dosing and distribution units 8 are configured as containers, while their individual devices 11 for processing and releasing the food components can be made with different designs. Thus, individual devices 11 for processing and release the food components can be made in the form of a dispenser with a grater, in the form of a dispenser with knives, in the form of a dispenser shaped as a cone crusher, and in the form of a peristaltic pump.

In the present invention, one part of the dosing and distribution units 8 is combined into the single separate object 31 which delimits them relative to each other by means of available dividing partitions 32 and provides a dosed delimited extraction of the food components with the help of the common processing and releasing device 33 activated in the case of its positioning with the desired unit 8. In this case, the device 33 is also made in the form of a dispenser of various configurations (a dispenser with a grater, a dispenser with knives, a dispenser in the form of a peristaltic pump, etc.). And the single separate object 31 itself is installed in one row between the dosing and distribution units 8 and 5 and is a disk-shaped body element having a three-dimensional shape, the working part of which (the part that is separated by the partitions 32) is configured to rotate around the central axis.

The special dosing and distribution units 9 and 10 used in the food preparation system are also configured as containers having lids and are intended for minced meat products and frozen semi-finished meat products stacked vertically in a row. These units are functionally connected to a mechanism 12 for forming cutlets, a device 13 for thermally treating the cutlets 13 and the final mechanism for feeding the cutlets to the product base 23. At the same time, the mechanism 12 for forming cutlets is configured as a molding device, the working components of which are configured to cover minced meat, perform its portion division, and give the processed mass a disk-like shape. The device for thermally treating the cutlets 13 is configured as a fenced area with a frying surface, on which the cutlets are placed, and the frying surface itself is divided into sections by working blades that turn over and move the cutlets, as they are ready, to an adjustable valve in order for the cutlets to pass into the feeding mechanism 14 usually configured as a controlled mass dispenser which can be structurally connected directly (without intermediate connections) to the special dosing and distribution unit 10.

The dosing and distribution units 8 arranged in the single separate object 31, as well as the special dosing and distribution units 9 and 10, can be equipped with temperature sensors, weight sensors, volume sensors, etc., which in turn are connected to the intelligent device 1 and transmit a corresponding signal to it in case of deterioration of any parameter (humidity, temperature, bacterial content, etc.) or transmit a signal about the sufficiency of applying the ingredient to the processed food or non-food base 23.

The individual devices 11 for processing and releasing the food components, the common processing and releasing device 33, and the cutlet feeding mechanism 14 are also connected to the intelligent device 1, from which they receive a command indicative of how much of a certain ingredient should be applied to a specific food or non-food base 23.

The main production equipment of the food preparation subsystem is suspended vertically, which allows using the action of gravity to push the ingredients down, i.e., to the operating region of the loading and unloading section 6.

In the process of programmed layer-by-layer replenishment of the base with the food components, the two-coordinate carrier table 5 with the food or non-food base 23 on it moves forward and backward along the two beams 28 and stops under the necessary individual devices 11 for processing and releasing the food components, possibly under the common processing and releasing device 33, and possibly under the cutlet feeding mechanism 14. Then, the signal from the servos 38 enters the intelligent device 1, as a result of which it instructs the necessary unit 8 to start the process of applying the food component, thereby causing the food or non-food base 23 to receive a kind of product layer of a certain component. At the same time, it should be noted that when the command is received by the unit 8 arranged in the separate object 31, this unit is positioned with the common processing and release device 33 (by rotating the working part of the separate object 31); only after that, the layer of food ingredient is applied.

For the best positioning and accurate application of the food components, the working platform 36, on which the food or non-food base 23 is placed, is configured to move independently in the longitudinal and transverse directions.

Separately, it is necessary to designate the design of the two-coordinate carrier table 5 including a base 35 on which the working platform 36 with a metal support 37 is installed, on which the food or non-food bases 23 are already stacked. The two-coordinate carrier table 5 is configured to move along the two beams 28 back and forth. The working platform 36 is configured to perform independent movement transversely and longitudinally, as well as rotate around its axis, for which the servos 38 are used, as well as the bearing devices 40 with the screw pairs and the revolution counters.

By using the two-coordinate carrier table 5 thus configured, the high quality and accuracy of applying the layers of food components are ensured, while the layers can be applied to the entire surface of the food or non-food base 23, as well as to its individual parts, which ensures the guarantee and control of the coating of surfaces of the food or non-food basics 23.

Under the working platform 36 of the two-coordinate carrier table 5, weight sensors 39 are installed, by which it is possible to send, after each operation, information about how much of a certain ingredient applied to the food or non-food base 23 to the intelligent device 1, and if the volume does not meet the standard, the intelligent device 1 instructs the desired unit 8, 9 or 10 to supplement the contents of the food or non-food base 23, if required.

After all the necessary ingredients are applied to the food or non-food base 23 and the product is essentially cooked (practically ready), the product on the two-coordinate carrier table 5 passes through the packaging device 18, in which the product is packaged, if this is provided for by a specific manufacturing cycle previously established by the consumer at the stage of making the order. After that, by using the means 19 for transferring formed products, the packaged products enter the subsystem 20 for storing and issuing finished products 24. If the products are not subject to packaging, then they immediately pass further through the loading and unloading section 6 without packaging, and are also transferred by the means 19 for transferring the formed products to the system 20 for storing and issuing the finished products 24.

Figure 6:
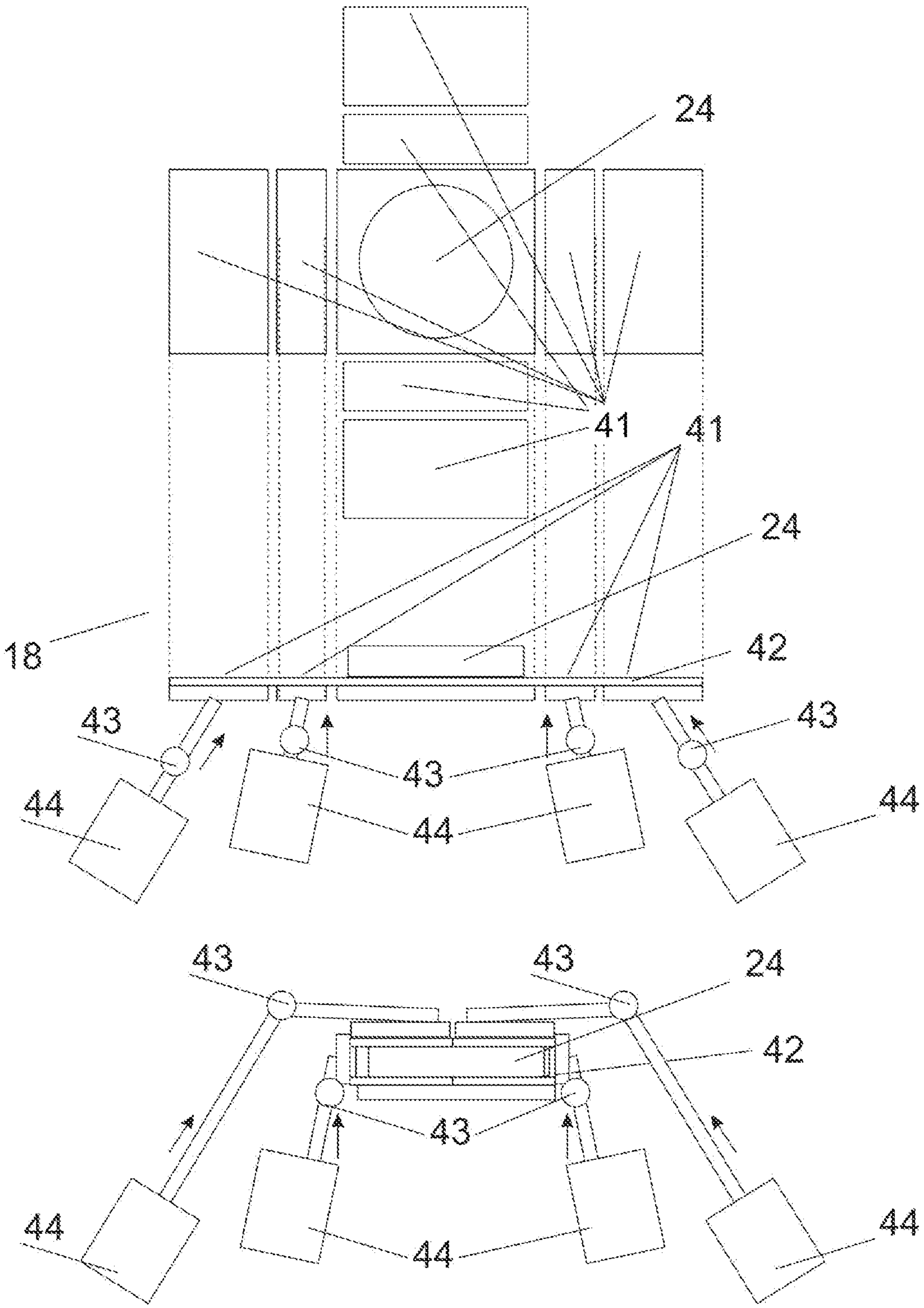
FIG. 6 shows an embodiment of a packaging device.
Figure 7:
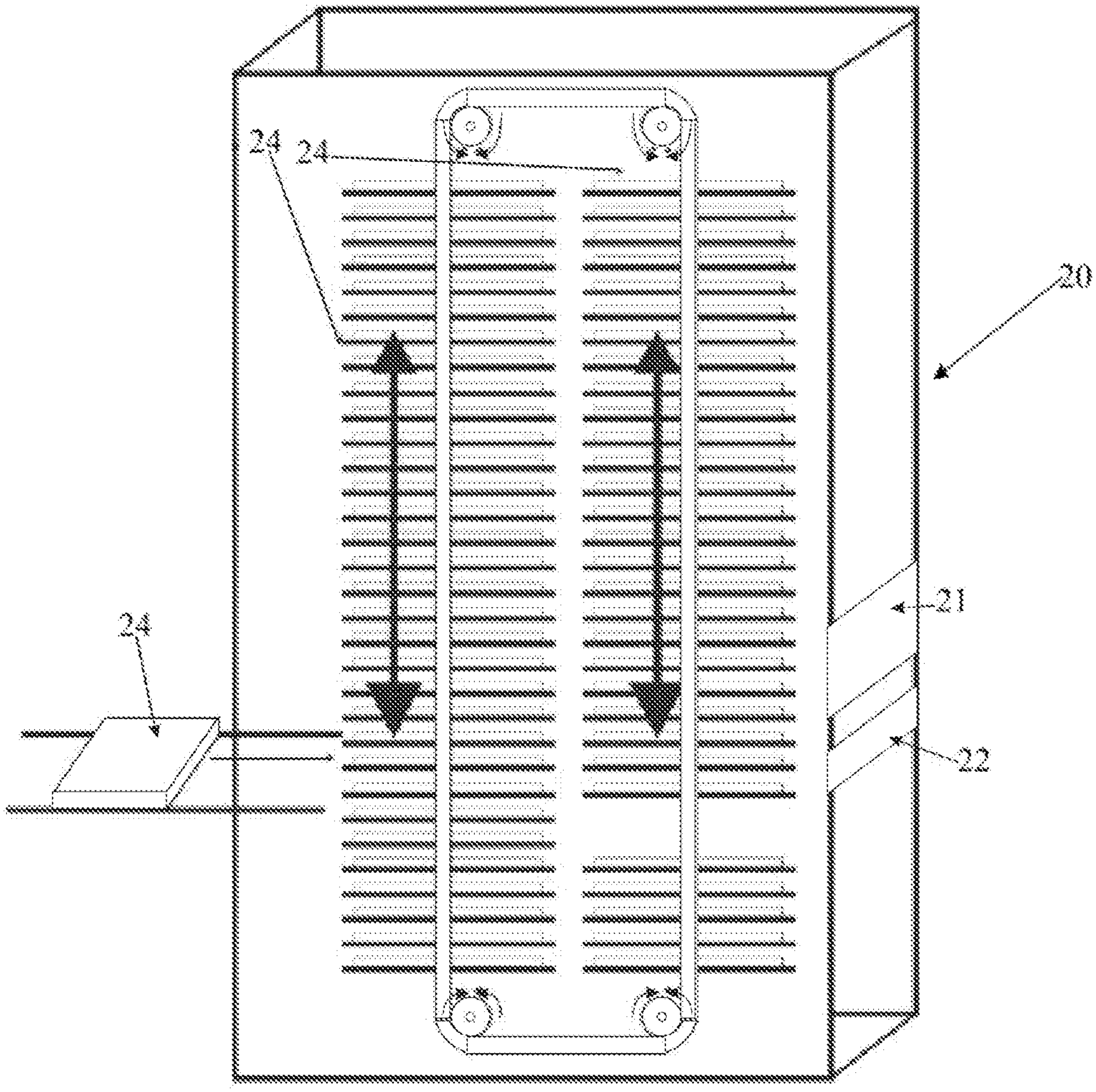
FIG. 7 shows an embodiment of a subsystem for temporary storage and issue of products.

The design of the packaging device 18 is shown in FIG. 6 and actually is a block system controlled by the intelligent device 1 and comprising a support with a packing sheet 42, on which the food or non-food base 23 replenished with the ingredients is placed and packed from all sides by means of movable elements 41 of the sheet 42. The movable elements 41 wrap the product due to the controlled action of a piston system arranged under the support and comprising a set of pistons 43 with press pushers 44.

The means 19 for picking up and transferring the formed products is configured as a gripping piston-pusher which, as mentioned earlier, can control the transfer of almost finished products to the receiving area of the subsystem 20 for storing and issuing the finished products 24.

The formed products, having arrived through the means 19 for transferring the formed products into the subsystem 20 for storing and issuing the finished products, if necessary, has the possibility of heating, which is used if the products contain frozen components or their recipe requires heating, or this is a prerequisite formed at the stage of placing the order. For this purpose, the subsystem 20 for storing and issuing the finished products has a heating element and structurally implies the presence of a vertically oriented conveyor-type device which is based on a flexible working member moving in a closed loop with alternating shelves, on which the finished products 24 are placed. Moving up or down, the finished products are fed into the intake area 22 based on the command coming from the intelligent device 1 in accordance with the previously placed order.

In the presented embodiment of the proposed culinary system, the cooled conditions for preparing food products are provided by means of a box 16 which creates the possibility of cooling (contains refrigeration equipment) the enclosed space inside which the main and auxiliary equipment pieces are placed together.

If necessary, the finished products 24 can be stored for a certain amount of time in the subsystem 20 until it is issued to the customer.

At the same time, after the products (sandwich, sandwich, pie, spring rolls, pizza, salad, and others) are prepared, the intelligent device 1 sends a command to the central server which sends a notification to the client on his/her mobile device, computer, tablet, laptop or notifies him/her in another way, including notifying an operator that the product is ready and subject to transfer to a specific customer.

If the order was placed remotely via the Internet, the received notification contains a secret code that allows one to identify the customer, for which the customer approaches the finished product intake area 22, enters this code on the interactive screen 21 configured to interact with the consumer, or brings a mobile device to the reader of the subsystem and shows the QR code received from the central server.

The program installed on the intelligent device 1 identifies the client and activates the opening of the finished product intake area 22 which has received the product previously selected in accordance with his/her order. Due to this, the client can receive the product ordered by him/her from the outside of the subsystem 20.

The software of the intelligent device 1 is configured to track the product readiness time, which is indicated to the client when confirming the order and send a notification to the client about the readiness of the order and the period of its storage. If the specified storage time passes after notification of the readiness of the order, the order enters the "not selected" status and is subject to disposal during the maintenance of this system by a process operator.

Thus, it has been established that the presence of groups of interconnected and interacting production equipment pieces dispersed in one production cooled area, including culinary robots controlled by the intelligent device 1, creates a kind of organic, promising and technically perfect structure having innovative manipulator devices that can greatly simplify work and increase the speed of processing product orders, ensuring error-free and machine-like accuracy of movements at all involved production stages. All of this, in turn, allows the system to work autonomously for a long time without the control of service personnel, while maintaining the quality and freshness of products. As a result, there is a significant competitive advantage and further prerequisites for the commercially successful implementation of this technology in the world market.

From a technical point of view, it should be noted that the equipment used for the storage and primary supply of the food or non-food bases 23—which is made in the form of the automated refrigeration unit 2 of a cylindrical shape and the rotating manipulator mechanism 25 combined with the automatic device 3 for picking up and primary supply of products on the culinary processing line—creates a technical section of the system that is verified from the point of view of ergonomics and capable of using the available rotational process and the specified cylindrical configuration in order to optimize the spatial position of the products that effectively occupy the available usable volume. This certainly has a positive effect and increases production potential, while maintaining a balance of high product quality and high production volumes.

In addition, by using the group of individually designed dosing and distribution units 8 which are combined into the single separate object 31 delimiting the units 8 included in its composition relative to each other and providing a dosed delimited extraction of food components using the common processing and releasing device 31 that is activated in the case of its positioning with the required unit 8, favorable conditions for the optimal and rational use of the available food raw materials can be created, while increasing the content and variety of the food components and maintaining the same conditionally established production dimensions of the culinary system.

It should be noted that the two-axis carrier table 5 comprises the digital video camera 7. During the movement of the two-axis carrier table 5, the digital video camera 7 transmits, to the intelligent device 1, information about the appearance of the food or non-food base 23 before and after the application of each ingredient. Also, video monitoring of the absence of foreign and inadmissible objects is carried out. If the software of the intelligent device 1 determines a low quality rating and shortcomings of the food or non-food base 23, for example, the inaccurate application of the layer of the ingredient, then the intelligent device 1, having determined this fact, will be able to command the two-axis carrier table 5 to change the position of the unprocessed food or non-food bases 23 in relation to the required unit 8, 9 or 10, in order to correct the necessary product layer, if possible.

If it is established that an unacceptable object has hit the food components, the intelligent device 1 immediately activates a command to the two-coordinate carrier table 5 to move the low-quality food or non-food base 23 close to the actuating element 15 to remove it from the system. The actuating element 15 is arranged within the loading and unloading section 6 and is made in the form of a separate installed unit equipped with a piston-pusher with a stop, which move low-quality products to a storage for irretrievable disposal. In this case, the intelligent device 1 sends a signal to the automatic refrigeration unit 2 to form and supply, for further processing, a new food or non-food base 23 which will replace the one being disposed of.

The proposed production system can be equipped with an antibacterial ultraviolet radiation means 17 which periodically or constantly, depending on its settings, treats the equipment from bacteria.

In addition, the proposed system can be represented as a stationary vending machine, a system installed on a vehicle, or as a system containing wheels for movement.

The proposed invention will find wide application in the field of public catering as a safe and technologically advanced system for preparing instant food products characterized by a layered structure.

What is claimed is:

1. A robotic culinary system for preparing layered food products under cooled conditions, comprising:

a conveyor subsystem comprising an intelligent working member and an equipped loading and unloading section, the intelligent working member being configured to travel through the equipped loading and unloading section, the equipped loading and unloading section having an operating region within which a storage and primary supply equipment for food or non-food bases and a food preparation subsystem adjacent to the storage and primary supply equipment are arranged;

wherein the storage and primary supply equipment is configured as an automated refrigeration unit having a rotating manipulator mechanism for the food or non-food bases, the rotating manipulator mechanism being combined with an integrated device for picking up and primary supply of the food or non-food bases to an active surface of the intelligent working member for subsequent culinary processing of the food or non-food bases;

wherein the food preparation subsystem provides a calculated layer-by-layer delivery of food components to the corresponding food or non-food base and, accordingly, is configured as a group of dosing and distribution units, one part of which has an individual device for processing and releasing the food components, while the other part of which is combined into a single separate object that delimits the dosing and distribution units relative to each other and provides a dosed delimited extraction of the food components using a common processing and releasing device configured to be activated in case of positioning with a required dosing and distribution unit from among the dosing and distribution units;

wherein the complex operation of the conveyor subsystem and the food preparation subsystem is controlled by an intelligent device connected to a central server;

wherein, when a cooking cycle of each food or non-food base is completed, the intelligent device is configured to send a control signal to a means for transferring a practically prepared food product which is arranged in an end area of the equipped loading and unloading section and is configured to transfer the practically prepared food product to an integrated subsystem for temporarily storing and issuing a ready-to-eat food product, which is interconnected with a packaging device;

wherein the ready-to-eat food product subsequently, in a heated or non-heated state, enters an intake area which is activated for a consumer if a verification procedure is successfully completed.

2. The robotic culinary system of claim 1, wherein a two-coordinate carrier table is used as the intelligent working member of the conveyor subsystem and configured to move along equipped beams laid on a support means.

3. The robotic culinary system of claim 2, wherein the two-coordinate carrier table comprises a support having a working platform installed thereon, the working platform being configured to move in longitudinal and transverse directions.

4. The robotic culinary system of claim 2, wherein the two-coordinate carrier table is equipped with a digital product quality monitoring tool.

5. The robotic culinary system of claim 4, wherein the digital product quality monitoring tool is implemented as a photo and/or video camera.

6. The robotic culinary system of claim 4, wherein the intelligent device is configured to analyze incoming images from the digital product quality monitoring tool and, in case of incomplete reference compliance of the products, generate programmed command signals activating necessary operational modes of the two-coordinate carrier table that are aimed at eliminating deficiencies of the products.

7. The robotic culinary system of claim 4, wherein the intelligent device is configured to analyze received images by comparing the received images with loaded reference images, and in case of an unsatisfactory result, generate and send a command signal for removal of low-quality products, which is implemented by an actuating element arranged within the equipped loading and unloading section.

8. The robotic culinary system of claim 1, wherein the conveyor subsystem comprises an equipped conveyor device having an endless belt serving as the intelligent working member.

9. The robotic culinary system of claim 1, wherein the single separate object has a rounded cross-section.

10. The robotic culinary system of claim 1, wherein the cooled conditions are provided by a box configured to enclose a cooled space, inside which the conveyor subsystem, the food preparation subsystem, the integrated subsystem for temporarily storing and issuing the ready-to-eat food product and the packaging device are arranged together.

11. The robotic culinary system of claim 10, wherein the box is made transparent and is adapted for a visual overview of processes of product preparation taking place inside the box.

12. The robotic culinary system of claim 1, wherein an oven for baking the products is arranged within the equipped loading and unloading section.

13. The robotic culinary system of claim 1, wherein an exhaust device for removing odors emanating from the products is arranged within the operating region of the equipped loading and unloading section.

14. The robotic culinary system of claim 1, wherein the automated refrigeration unit has a cylindrical shape.

* * * * *